US009726310B2

(12) United States Patent
Gibb et al.

(10) Patent No.: US 9,726,310 B2
(45) Date of Patent: Aug. 8, 2017

(54) COMBINATION SEALING MEMBER AND PIPE COUPLINGS

(71) Applicant: Victaulic Company, Easton, PA (US)

(72) Inventors: John Gibb, Beeton (CA); Douglas R. Dole, Whitehouse Station, NJ (US); Michael V. Porter, Easton, PA (US)

(73) Assignee: Victaulic Company, Easton, PA (US)

( * ) Notice: Subject to any disclaimer, the term of this patent is extended or adjusted under 35 U.S.C. 154(b) by 167 days.

(21) Appl. No.: 14/277,271

(22) Filed: May 14, 2014

(65) Prior Publication Data

US 2014/0246852 A1 Sep. 4, 2014

Related U.S. Application Data

(63) Continuation of application No. 11/867,146, filed on Oct. 4, 2007, now Pat. No. 8,733,799, which is a (Continued)

(51) Int. Cl.
*F16L 17/00* (2006.01)
*F16L 21/02* (2006.01)
(Continued)

(52) U.S. Cl.
CPC .............. *F16L 21/02* (2013.01); *F16L 17/04* (2013.01); *F16L 21/005* (2013.01);
(Continued)

(58) Field of Classification Search
USPC ......... 277/603, 606–609, 647, 648; 285/365, 285/367, 373, 111, 112
See application file for complete search history.

(56) References Cited

U.S. PATENT DOCUMENTS

| 29,731 A | 8/1860 | Truss |
| 1,093,868 A | 4/1914 | Leighty |

(Continued)

FOREIGN PATENT DOCUMENTS

| DE | 10006029 A1 | 10/2000 |
| EP | 0306946 A2 | 8/1988 |

(Continued)

OTHER PUBLICATIONS

Kerins, John C.; Song, Daniel S.; and Martin, Brett C.; USPTO Decision on Appeal re: U.S. Appl. No. 95/001,878; Jul. 13, 2016.
(Continued)

*Primary Examiner* — Aaron Dunwoody
(74) *Attorney, Agent, or Firm* — Ballard Spahr LLP

(57) ABSTRACT

A sealing member is disclosed having an outer surface that supports segments of a pipe coupling for joining pipe elements in end to end relation. The segments are supported in spaced relation to permit the pipe elements to be inserted into the coupling without disassembly. The sealing member is a flexible ring that has conical lips around its inner circumference to engage and guide the pipe elements into the coupling. A tongue extends radially inwardly between the lips, the tongue having conical shoulders which engage and guide the pipe ends. The tongue locates the coupling segments relatively to the pipe elements.

16 Claims, 8 Drawing Sheets

Related U.S. Application Data continuation of application No. 11/128,728, filed on May 13, 2005, now abandoned.

(60) Provisional application No. 60/571,596, filed on May 14, 2004.

(51) Int. Cl.
| | |
|---|---|
| *F16L 17/04* | (2006.01) |
| *F16L 21/06* | (2006.01) |
| *F16L 23/08* | (2006.01) |
| *F16L 23/18* | (2006.01) |
| *F16L 25/14* | (2006.01) |
| *F16L 21/00* | (2006.01) |

(52) U.S. Cl.
CPC ............ *F16L 21/065* (2013.01); *F16L 23/08* (2013.01); *F16L 23/18* (2013.01); *F16L 25/14* (2013.01); *Y10T 29/53987* (2015.01)

(56) References Cited

U.S. PATENT DOCUMENTS

| | | |
|---|---|---|
| 1,541,601 A | 6/1925 | Tribe |
| 1,851,574 A | 3/1932 | Fiederlein |
| 1,867,891 A | 7/1932 | Reynolds |
| 2,020,156 A | 11/1935 | Muchnic |
| 2,041,132 A | 5/1936 | Johnson |
| 2,449,795 A | 9/1948 | Stillwagon |
| 2,688,500 A | 9/1954 | Scott |
| 2,709,094 A | 5/1955 | Planski |
| 2,752,173 A | 6/1956 | Krooss |
| 3,176,723 A | 4/1965 | Hodgeman et al. |
| 3,213,187 A | 10/1965 | Kish |
| 3,291,506 A | 12/1966 | Blakeley |
| 3,351,352 A * | 11/1967 | Blakeley ............... F16J 15/025 277/615 |
| 3,464,722 A | 9/1969 | Larkin |
| 3,550,638 A | 12/1970 | Smith |
| 3,794,361 A | 2/1974 | Westberg |
| 3,966,237 A | 6/1976 | Thiessen |
| 3,977,705 A | 8/1976 | Theissen et al. |
| 4,258,941 A | 3/1981 | Sands |
| 4,311,248 A | 1/1982 | Westerlund et al. |
| 4,326,737 A | 4/1982 | Lehmann |
| 4,403,378 A | 9/1983 | Engman |
| 4,471,979 A | 9/1984 | Gibb et al. |
| 4,506,418 A | 3/1985 | Viola et al. |
| 4,522,434 A | 6/1985 | Webb |
| 4,601,495 A | 7/1986 | Webb |
| 4,611,839 A | 9/1986 | Rung et al. |
| 4,640,530 A | 2/1987 | Abbes et al. |
| 4,643,461 A | 2/1987 | Thau, Jr. et al. |
| 4,702,500 A | 10/1987 | Thau, Jr. et al. |
| 4,722,561 A | 2/1988 | Heckethorn et al. |
| 4,726,611 A | 2/1988 | Sauer |
| 4,861,075 A | 8/1989 | Pepi et al. |
| 4,893,843 A | 1/1990 | DeRaymond |
| 4,896,902 A | 1/1990 | Weston |
| 5,018,548 A | 5/1991 | McLennan |
| 5,058,931 A | 10/1991 | Bowsher |
| 5,094,492 A | 3/1992 | Levivier |
| 5,142,536 A | 8/1992 | Akao et al. |
| 5,203,594 A | 4/1993 | Straub |
| 5,230,537 A | 7/1993 | Newman |
| 5,248,169 A | 9/1993 | Barbe et al. |
| 5,249,829 A | 10/1993 | Hendrickson |
| 5,280,970 A | 1/1994 | Straub |
| 5,498,042 A | 3/1996 | Dole |
| 5,647,613 A | 7/1997 | Marik et al. |
| 5,758,906 A | 6/1998 | Carlstrom et al. |
| 5,911,446 A | 6/1999 | McLennan et al. |
| 6,070,911 A | 6/2000 | Namikawa et al. |
| 6,170,884 B1 | 1/2001 | McLennan et al. |
| 6,302,450 B1 | 10/2001 | Dole et al. |
| 6,312,025 B1 | 11/2001 | Wolfsdorf |
| 6,367,843 B1 | 4/2002 | Fetzer |
| 6,367,849 B1 | 4/2002 | Tatsuta et al. |
| 6,581,977 B1 | 6/2003 | Dole et al. |

FOREIGN PATENT DOCUMENTS

| | | |
|---|---|---|
| GB | 2211255 A | 6/1989 |
| GB | 2218768 A | 11/1989 |
| WO | 0057093 | 9/2000 |
| WO | 0159350 A1 | 8/2001 |

OTHER PUBLICATIONS

Song, Daniel S.; Guest, Rae Lynn P.; and Martin, Brett C.; USPTO Decision on Appeal re: U.S. Appl. No. 95/001,880; Feb. 22, 2017.

* cited by examiner

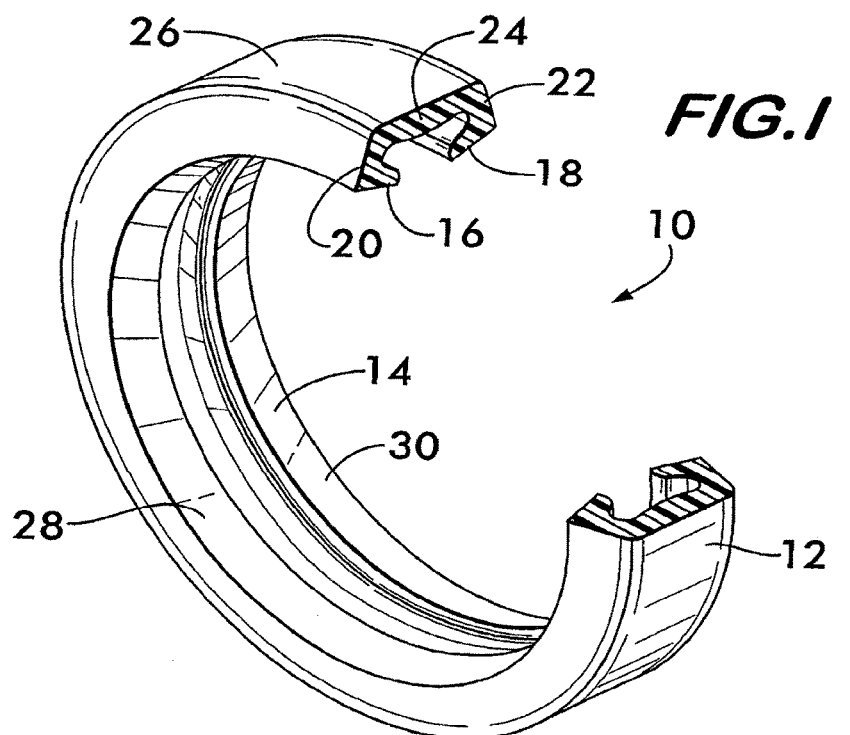
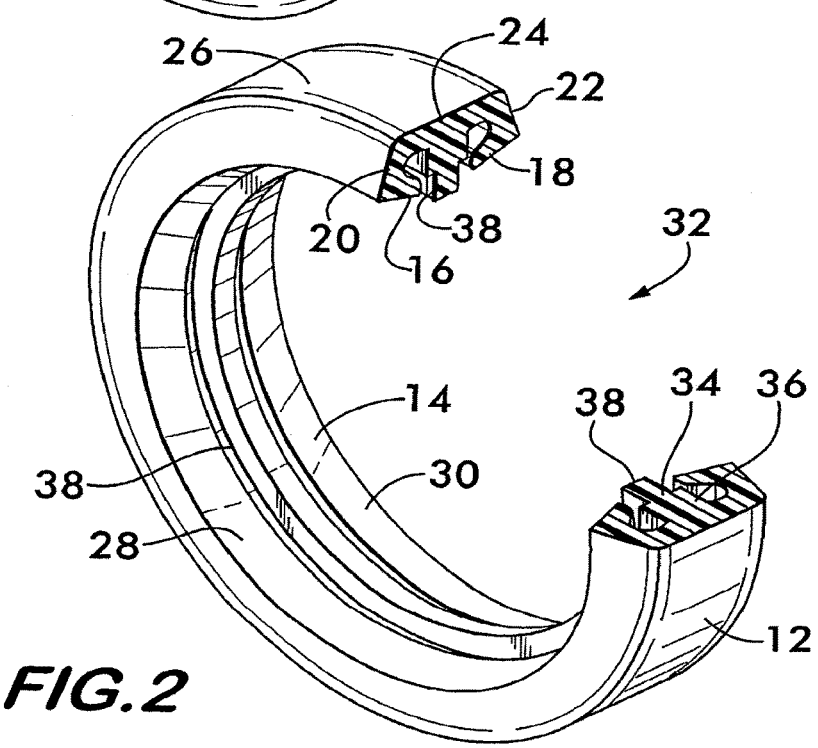

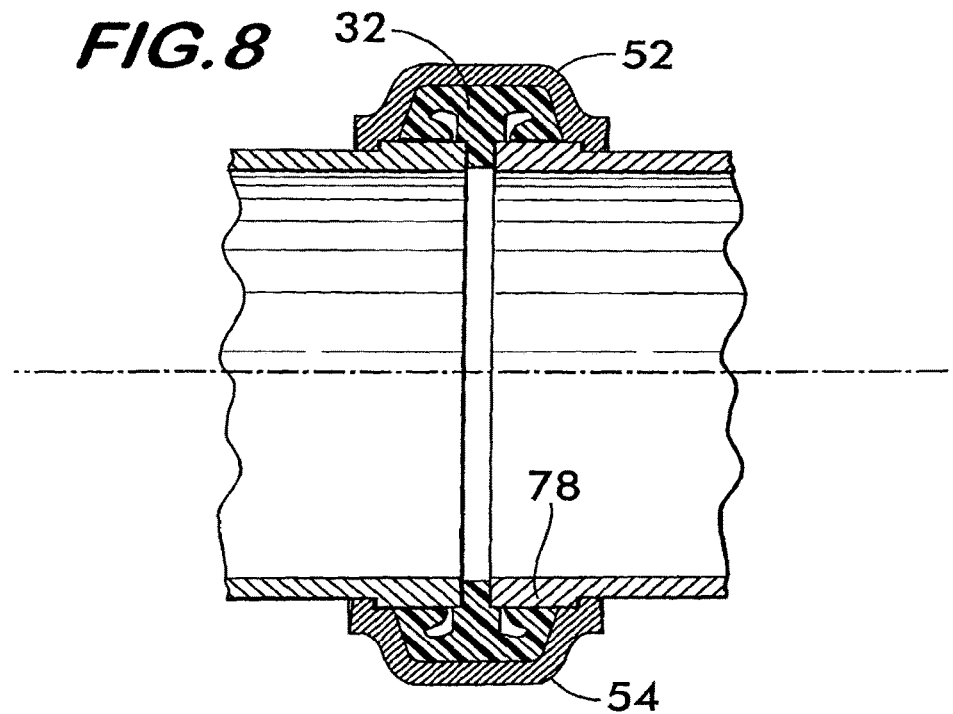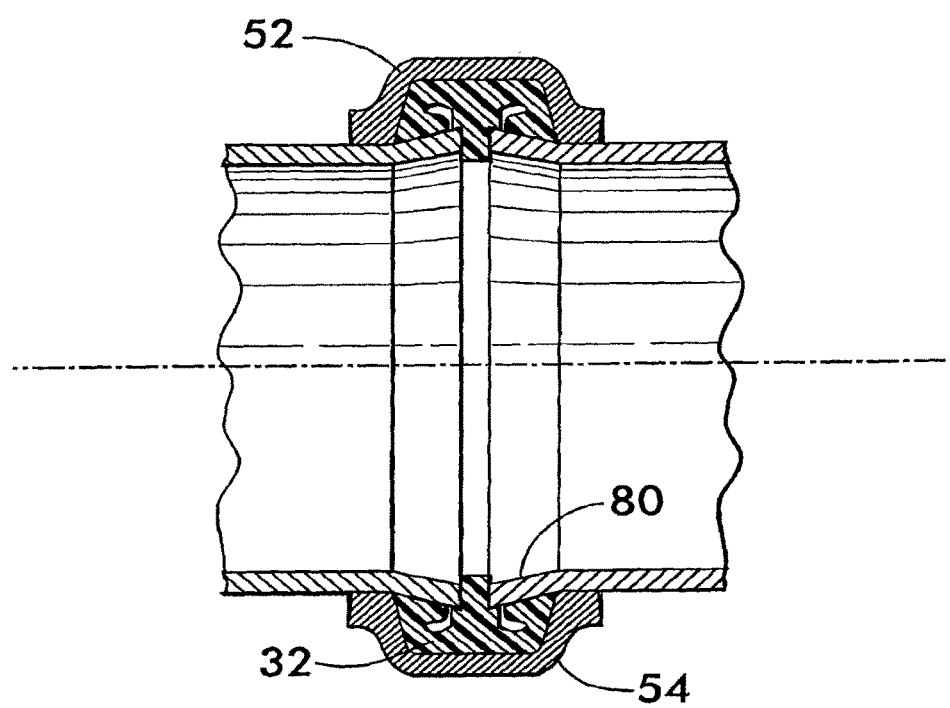

COMBINATION SEALING MEMBER AND PIPE COUPLINGS

CROSS-REFERENCE TO RELATED APPLICATIONS

This application is a continuation of U.S. application Ser. No. 11/867,146, filed Oct. 4, 2007, now U.S. Pat. No. 8,733,799, issued May 27, 2014, which is a continuation of U.S. application Ser. No. 11/128,728, filed May 13, 2005, now abandoned, which claims priority to U.S. Provisional Application No. 60/571,596, filed May 14, 2004.

FIELD OF THE INVENTION

This invention relates to flexible seals for use in combination with mechanical pipe couplings to ensure a fluid-tight joint.

BACKGROUND OF THE INVENTION

Mechanical couplings for joining pipe elements together end-to-end comprise interconnectable segments that are positionable circumferentially surrounding the end portions of coaxially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and/or external forces. The housings define an annular channel that receives a sealing member, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings and the outer surfaces of the pipe elements in prior art couplings results in a tedious and time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not prelubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY OF THE INVENTION

The invention concerns, in combination, a coupling and a sealing member. The coupling comprises a plurality of segments joined end to end. The coupling secures pipe elements together in end to end relationship. The segments have arcuate surfaces facing inwardly which are engageable with outer surfaces of the pipe elements. The segments also have adjustably tightenable connection members for drawing them toward one another. The sealing member is positioned between the segments and comprises a flexible, resilient ring having a ring inner surface adapted to engage the outer surfaces of the pipe elements. The ring inner surface has a diameter sized to receive the pipe elements upon insertion of the pipe elements between the segments. The ring has a ring outer surface with a diameter supporting the segments in a preassembled state wherein the segments are supported on the ring in spaced apart relation sufficient to allow the pipe elements to be inserted therebetween. Tightening of the connection members move the segments toward one another, compressing the ring. The ring is deformable upon motion of the segments to permit engagement of the arcuate surfaces with the pipe elements.

Preferably, the ring inner surface comprises first and second lips extending circumferentially around the ring. The lips are positioned on opposite sides of the ring in spaced apart relation and project substantially inwardly toward one another. The lips are adapted to engage the outer surfaces of the pipe elements and form a fluid tight seal when the ring is compressed by the segments.

The first and second lips each have a conical surface facing outwardly from the ring. The conical surfaces have a width sized to engage and guide the pipe elements between the segments when the pipe elements are inserted therebetween.

The sealing member may also have a backwall that forms the ring outer surface. First and second sidewalls are positioned in spaced apart relation on opposite sides of the ring. The sidewalls extend substantially radially inwardly from the backwall. The first lip is attached to the first sidewall, and the second lip is attached to the second sidewall. A tongue is attached to the backwall and extends circumferentially around the ring. The tongue is positioned between the first and the second lips and projects substantially radially inwardly. The tongue engages ends of the pipe elements upon insertion thereof between the segments. The tongue facilitates positioning the segments relatively to the pipe elements.

Preferably, the tongue comprises a root portion attached to the backwall, and a tip portion extending from the root portion. The tip portion has a smaller thickness than the root portion, and a pair of shoulders are formed on opposite sides of the tongue between the root portion and the tip portion. Each of the shoulders has a conical profile shape for engaging and guiding the pipe elements upon insertion thereof between the segments.

BRIEF DESCRIPTION OF THE DRAWINGS

FIG. 1 is an isometric view, partially cut away, of an embodiment of a sealing member according to the invention;

FIG. 2 is an isometric view, partially cut away, of another embodiment of a sealing member according to the invention;

FIGS. 8 and 9 are longitudinal sectional views of pipe joints using sealing members according to the invention;

DETAILED DESCRIPTION

Figure 2A:
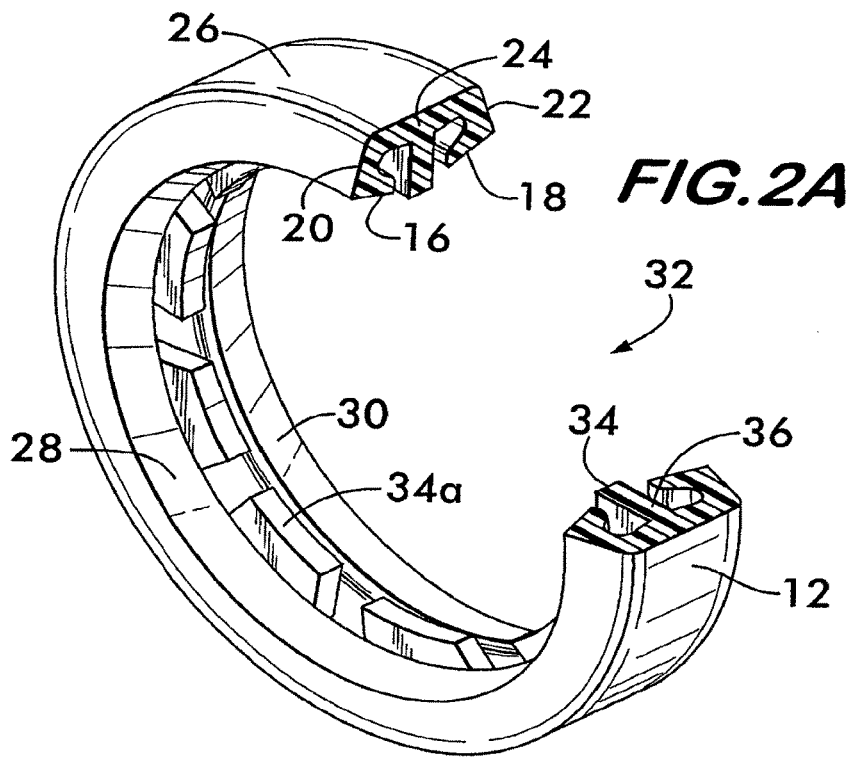
FIG. 2A is an isometric view, partially cut away, of another embodiment of a sealing member according to the invention.

FIG. 1 shows a perspective view of a sealing member 10 according to the invention. Sealing member 10 comprises a flexible, resilient ring 12 having a ring inner surface 14. Preferably, ring inner surface 14 is formed of a pair of lips 16 and 18 that are attached to respective sidewalls 20 and 22 that extend from a backwall 24. Backwall 24 provides a ring outer surface 26 that extends circumferentially around the ring. The sidewalls and the lips are positioned in spaced apart relation on opposite sides of the ring 12. Lips 16 and 18 project substantially inwardly toward one another and have respective conical surfaces 28 and 30 that slope inwardly toward the center of ring 12 to act as a lead-in to guide pipe elements into engagement with the sealing member as described below.

Figure 2B:
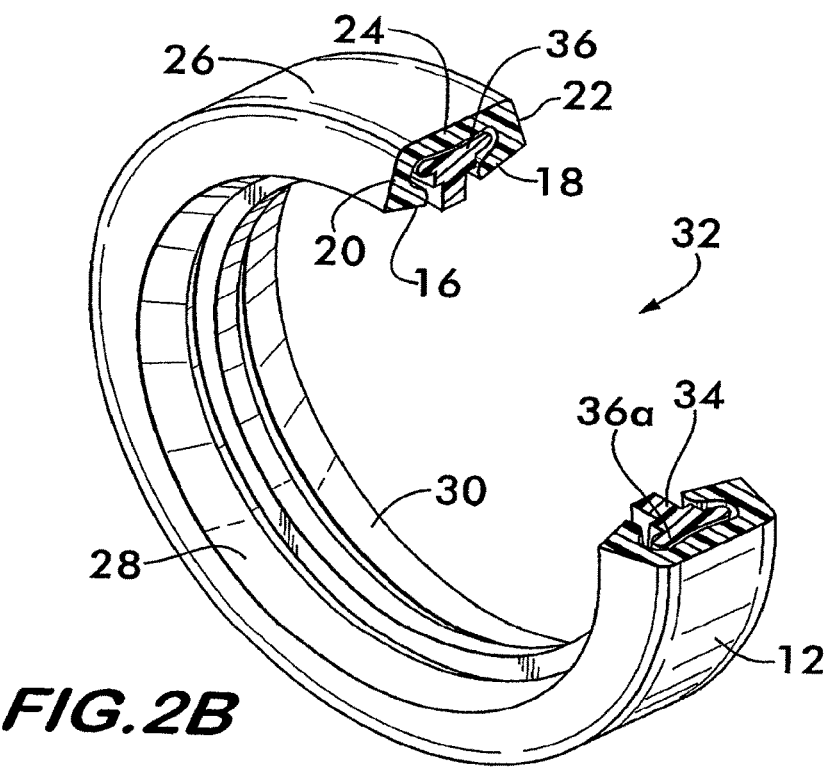
FIG. 2B is an isometric view, partially cut away, of yet another embodiment of a sealing member according to the invention.

In a preferred embodiment 32 of the sealing member, shown in FIG. 2, ring 12 further includes a tongue 34. Tongue 34 is positioned between lips 16 and 18 and has a root portion 36 that is attached to the backwall 24 opposite to the ring outer surface 26. Tongue 34 projects substantially radially inwardly from the backwall 24 and extends circumferentially around ring 12. The tongue may be substantially continuous, as shown in FIG. 2, or may comprise a plurality of sections 34a in spaced apart relation to one another around the ring as shown in FIG. 2A. In another embodiment, shown in FIG. 2B, the root portion 36 of tongue 34 is not attached to the backwall 24, but has a flared base 36a that engages the backwall and side walls 20 and 22 to maintain the tongue in position between lips 16 and 18.

Figure 3:
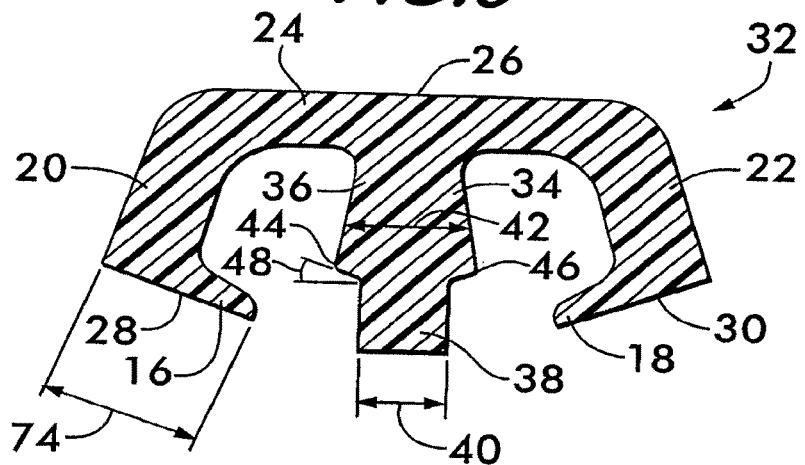
FIG. 3 is a cross sectional view of a sealing member embodiment according to the invention.

In a preferred embodiment 32, best shown in FIG. 3, tongue 34 has a tip portion 38 extending from the root portion 36. The thickness 40 of tip portion 38 is smaller than the thickness 42 of the root portion 36. This dimensional relation results in a pair of shoulders 44 and 46 being formed between the root and tip portions. Preferably, the shoulders 44 and 46 have conical profile shapes for engaging and guiding pipe elements as described below. Cone angles 48 up to about 30° are advantageous for the functioning of the tongue 34.

Figure 4:
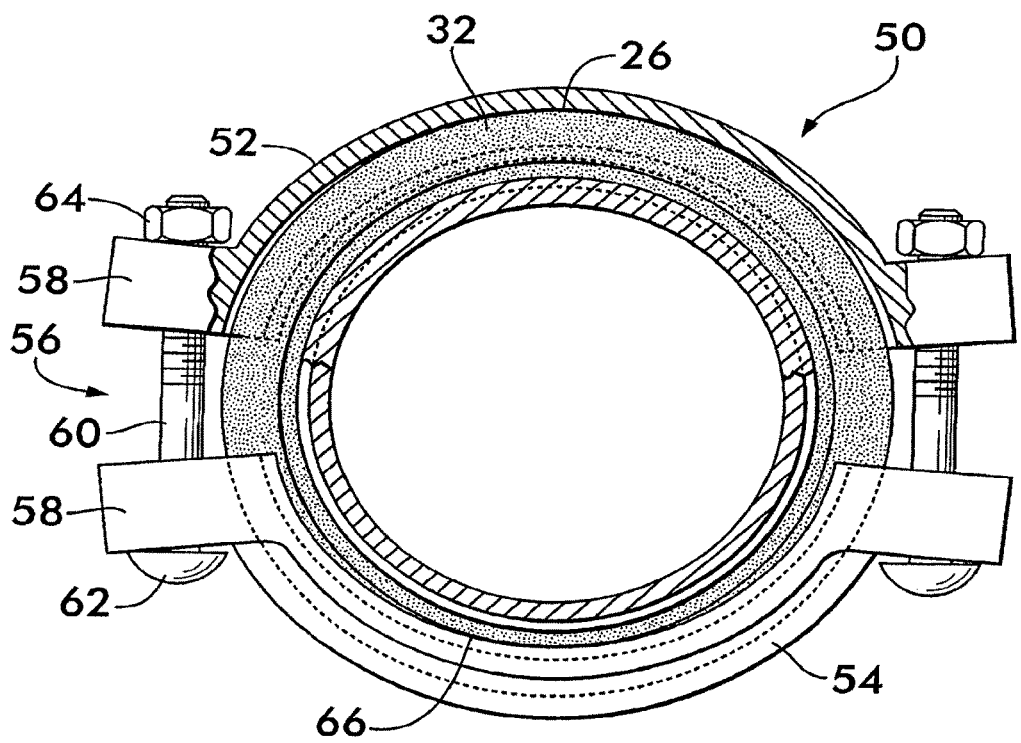
FIG. 4 is an axial cross sectional view of a coupling using a sealing member according to the invention.

As shown in FIG. 4, sealing members such as 10 and 32 are used with mechanical couplings 50 for securing pipe elements together in end to end relation, the sealing members ensuring a fluid tight joint. (Hereinafter, sealing member embodiment 32 is described, it being understood that the description applies to all sealing member embodiments according to the invention.)

Coupling 50 comprises a plurality of coupling segments, in this example, two segments 52 and 54. Other example embodiments may comprise three or more segments. The coupling segments shown in FIG. 4 are connected to one another by adjustably tightenable connection members 56, which preferably comprise lugs 58 that extend outwardly from the ends of each segment and are positioned in facing relation to one another to receive fasteners 60, such as bolts 62 and nuts 64. Each segment also has a pair of arcuate surfaces 66 that are positioned in spaced relation to one another and face inwardly for engagement with the outer surfaces of respective pipe elements as described below.

Figure 5:
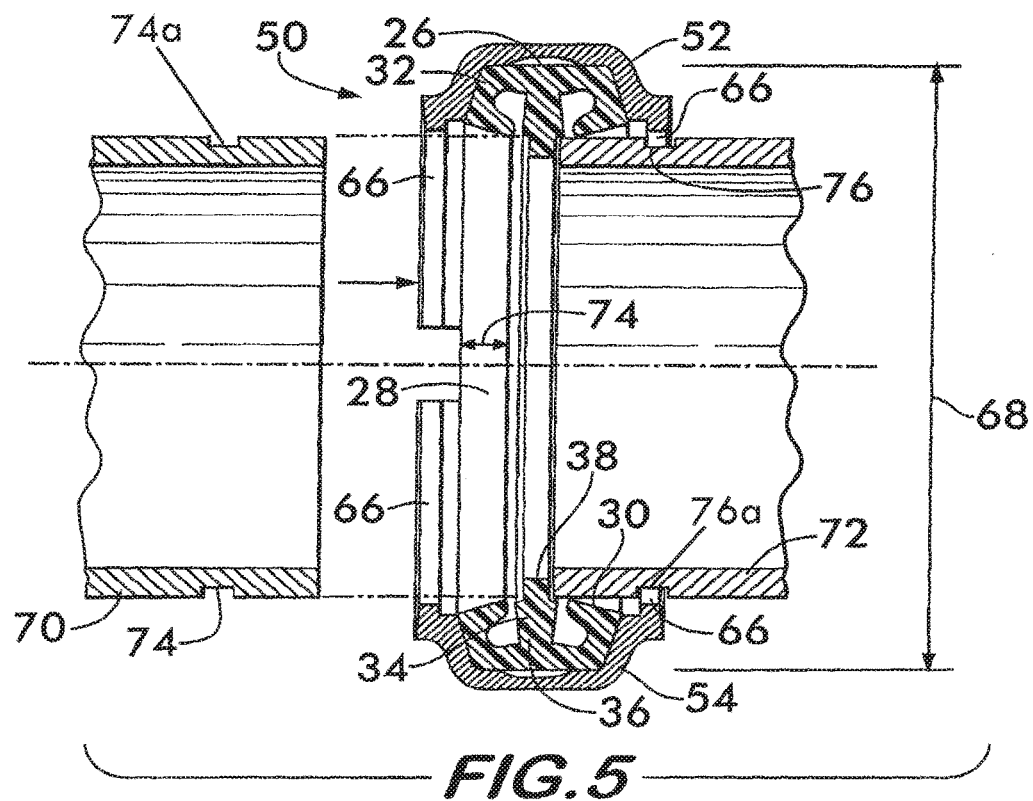
FIGS. 5 and 6 are longitudinal sectional views of the coupling shown in FIG. 4.
Figure 6:
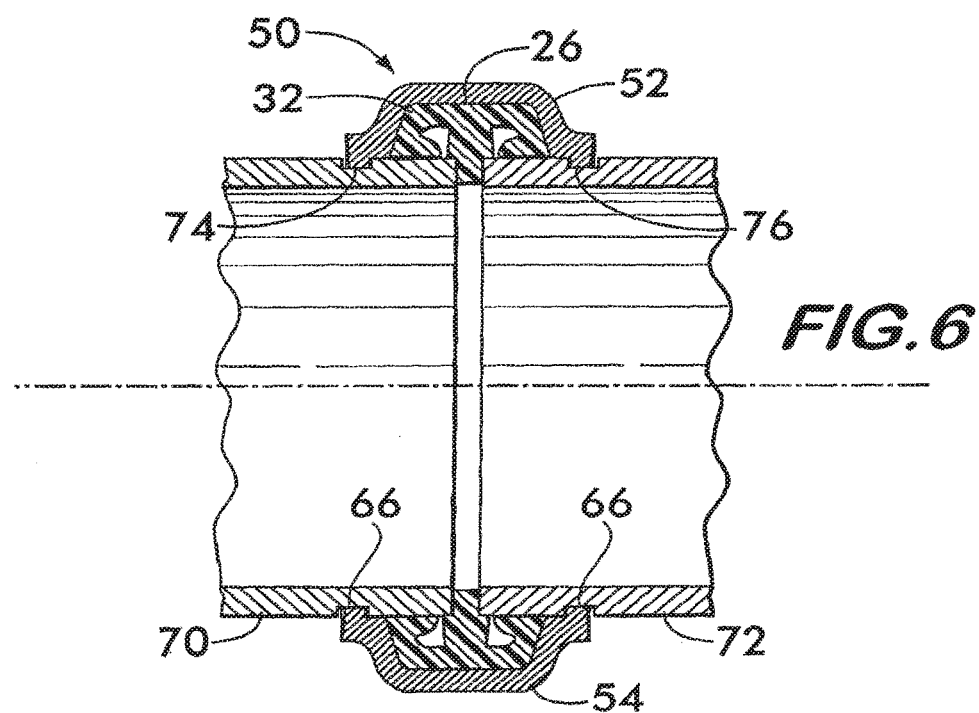
Figure 7:
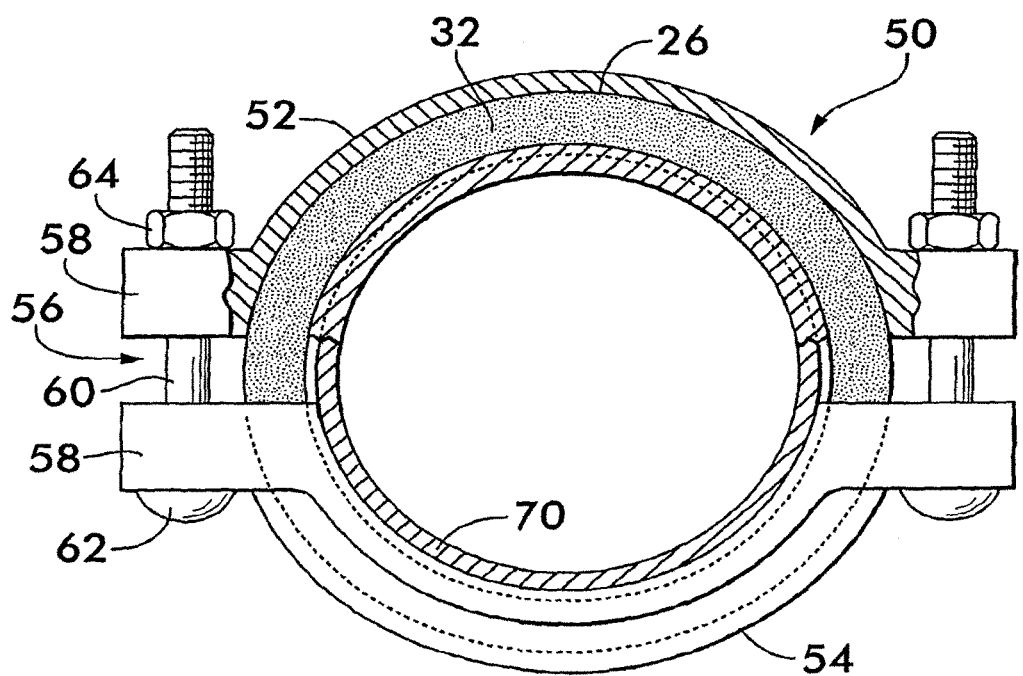
FIG. 7 is an axial cross sectional view of the coupling shown in FIG. 4.

FIG. 4 further shows the coupling 50 in a preassembled state, with segments 52 and 54 supported on the ring outer surface 26, the segments being held together in the preassembled state by the fasteners 60. The coupling 50 is preassembled under controlled conditions at the manufacturing facility and arrives on site in the preassembled state, ready for immediate use. As shown in FIG. 5, sealing member 32 is designed so that the ring outer surface 26 has a diameter 68 sized to maintain the segments 52 and 54 in spaced relation with sufficient clearance to allow pipe elements 70 and 72 to be inserted between the segments 52 and 54 without disassembling the coupling. Use of seals according to the invention thus provides significant advantage in reducing the labor required for assembly of the pipe joint as the coupling does not require total or even partial disassembly prior to the installation. Sealing member 32 also has sufficient stiffness to maintain the coupling segments in spaced apart relation through shipping and handling during installation, but is resilient and flexible, allowing it to deform as required when the fasteners 60 are tightened to draw the coupling segments 52 and 54 toward one another and engage the coupling arcuate surfaces 66 with the pipe elements as shown in FIGS. 6 and 7 to secure the pipe elements 70 and 72 in end to end relation and provide a fluid tight joint.

Note that the conical surfaces 28 and 30 of lips 16 and 18 each have a width 74 (see FIG. 3) that is sized so that the pipe elements engage the lips on the conical surfaces as they are inserted into coupling 50 (see FIG. 5). This conical lip geometry facilitates assembly of the pipe joint with the preassembled coupling. The lips serve as a lead in to guide the pipe elements into proper engagement with the seal, and also eliminate the need to remove the seal from the coupling and manually stretch and deform it to enable it to receive the pipe elements, as must be done for prior art seals.

Tongue 34 also enhances the ability to quickly and conveniently install pipe elements into the preassembled coupling 50. The conical profile of shoulders 44 and 46 further serve as a lead-in to guide the pipe elements into proper engagement with the sealing member 32. The shoulders 44 and 46 engage the ends of the pipe elements and limit the tongue's extension into the bore of the pipe elements where it might impede fluid flow and increase the head loss. Head loss due to resistance in joints becomes significant for long pipe runs having many joints, and is to be avoided. The tongue itself further serves as a stop to align the arcuate surfaces 66 of segments 52 and 54 with a desired target on the outer surface of the pipe elements, in the example shown in FIGS. 5 and 6, the respective floors 74a and 76a of circumferential grooves 74 and 76. Engagement between the grooves and the arcuate surfaces provide mechanical restraint to secure the pipe elements to the coupling.

Virtually any type of pipe element will benefit from the use of seals according to the invention. If plain end pipe elements are used (not shown), the target may be witness marks formed on the outer surface to indicate proper engagement depth between pipe element and coupling. As shown in FIGS. 8 and 9, pipe elements having shoulders 78 (FIG. 8) or pipe elements having flared ends 80 (FIG. 9) may be used with the sealing member according to the invention, the sealing member being readily geometrically adaptable to receive the various types of pipe elements.

Sealing members according to the invention may also be used with any type of multi-segment coupling where a seal is used to maintain separation between the segments in a preassembled state. The couplings themselves may have enhancements that provide additional clearance for insertion of the pipe elements, allowing the segments to be closer to one another in the preassembled state and still permit direct insertion of the pipe elements without any disassembly. To this end, the coupling shown in FIG. 4 is deformable as shown by a comparison of FIGS. 4 and 7. In the undeformed state, the arcuate surfaces 66 have a greater radius of curvature than the pipe elements that they are joining, and the surfaces 66 also subtend an arc of less than 180°. This geometry provides clearance at the 3 o'clock and 9 o'clock positions on the coupling (for a two segment coupling) allowing pipe element insertion. The coupling segments are deformed by tightening fasteners 60, which draw the segments 52 and 54 toward each other and force the arcuate surfaces 66 to engage the pipe elements and conform to its radius of curvature.

Figure 10:
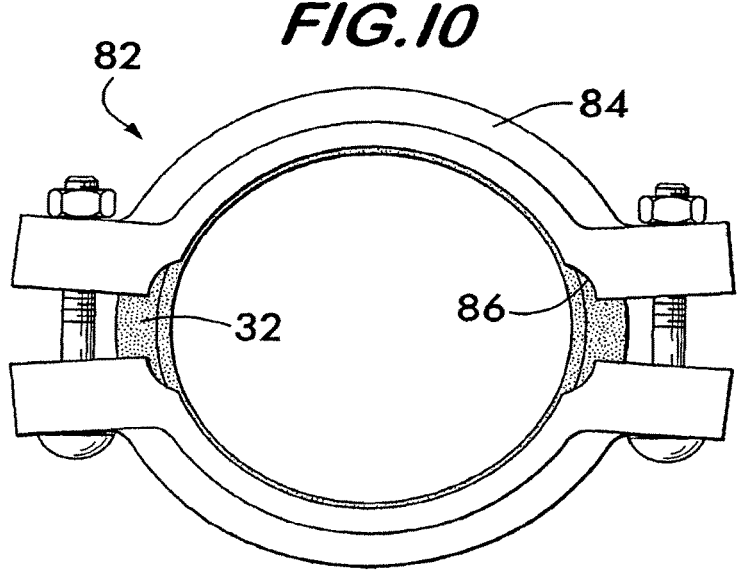
FIGS. 10 and 11 are axial views of pipe coupling embodiments that use the sealing member according to the invention.
Figure 11:
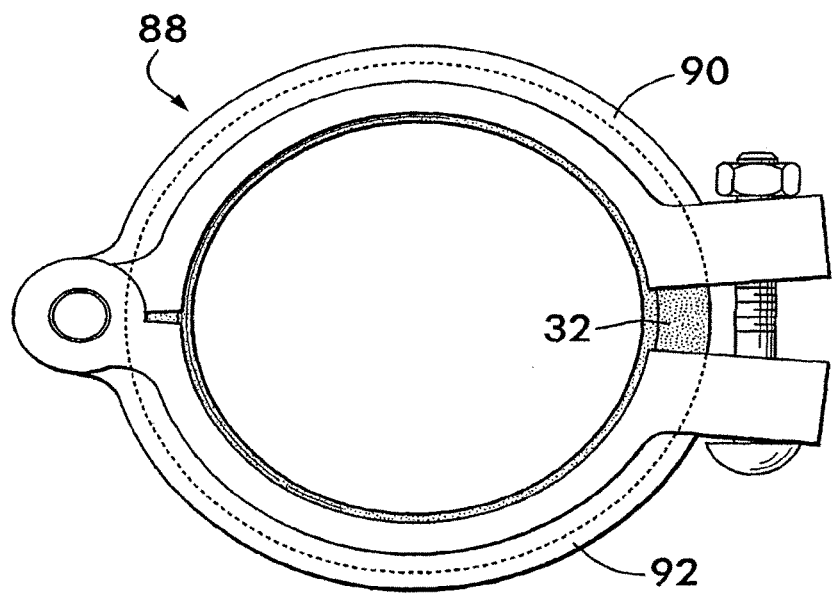
Figure 12:
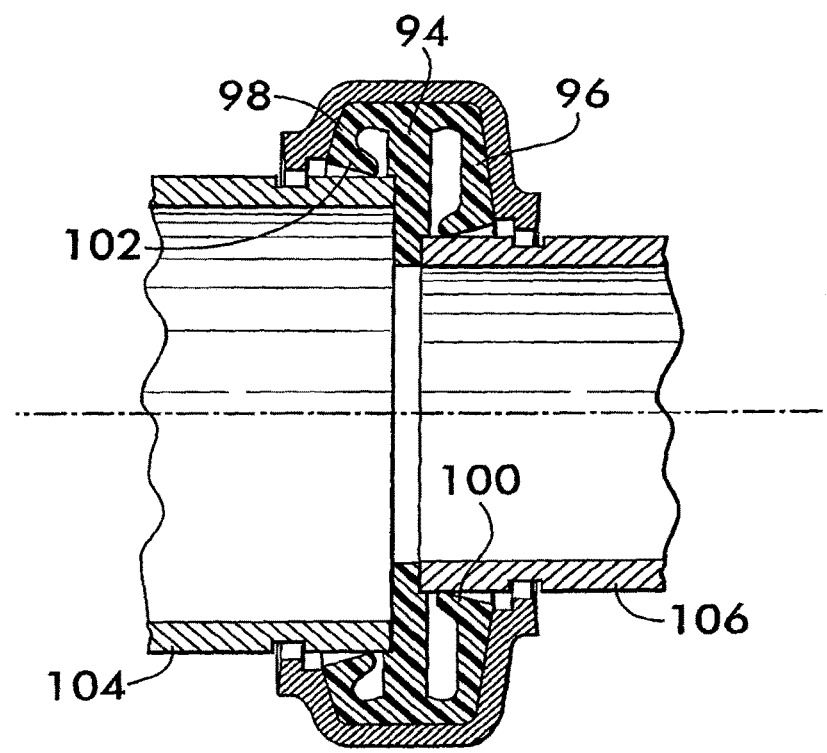
FIG. 12 is a longitudinal sectional view of an embodiment of a sealing member according to the invention.

FIG. 10 illustrates a pipe coupling 82 having segments 84 with cut-outs 86 at opposite ends of the arcuate surfaces 66. The cut-outs provide the desired clearance enhancement for the coupling. FIG. 11 shows a hinged coupling 88 wherein a sealing member 32 is used to maintain the segments 90 and 92 open to permit pipe element insertion. In FIG. 12 the sealing member 94 has one sidewall 96 that is wider than its other sidewall 98. This geometry positions the lip 100 attached to sidewall 96 at a smaller diameter than lip 102 attached to sidewall 98. The different diameter lips allow the seal to be used to couple pipe elements 104 and 106 having different diameters.

Sealing members according to the invention used with multi-segment couplings provide a significant advantage in assembly of pipe joints because they permit the couplings to be maintained in spaced relation in a preassembled state that facilitates assembly of the joint without the need to first disassemble the couplings.

What is claimed is:

1. In combination, first and second pipe elements and a coupling for joining said pipe elements end to end, said first and second pipe elements each having circumferential grooves at opposite ends, each of said grooves having a floor, said coupling comprising:
    a plurality of segments, each having oppositely disposed ends, and a respective connection member positioned at each said end, a first end of each said segment being connected to a second end of another of said segments such that said segments surround a central space for receiving said pipe elements;
    a pair of arcuate projections positioned on opposite sides of and extending along each of said segments;
    an arcuate surface positioned on each of said projections, each said arcuate surface being engageable with said floor of said groove in one of said pipe elements;
    a channel positioned between said projections on each of said segments;
    a seal received within said channel and having an outer surface sized to support said segments in spaced apart relation to provide clearance about a circumference of said pipe elements, including where measured adjacent to said connection members, said clearance being sufficient to permit insertion of said pipe elements into said central space, said seal having an inner surface sized to receive said pipe elements; wherein
    at least one of said connection members being adjustably tightenable for drawing each said arcuate surface into engagement with one of said floors upon tightening of said at least one connection member.

2. The combination according to claim 1, wherein each said projection extends between said oppositely disposed ends of said segments.

3. The combination according to claim 2, further comprising a cut-out located at each end of each said arcuate surface.

4. The combination according to claim 1, wherein each said projection subtends an angle less than 180°.

5. The combination according to claim 1, wherein each one of said segments is deformable so as to substantially conform a curvature of each one of said arcuate surfaces to a curvature of one of said floors upon tightening of said at least one connection member.

6. The combination according to claim 1, wherein two of said connection members are adjustably tightenable.

7. The combination according to claim 1, wherein said coupling comprises at most two of said segments.

8. The combination according to claim 1, wherein said coupling comprises three of said segments.

9. The combination according to claim 1, wherein said seal has sufficient stiffness to maintain said segments in said preassembled state during shipping and through handling of said coupling during insertion of said pipe elements into said central space.

10. In combination, first and second pipe elements and a coupling for joining said pipe elements end to end, said first and second pipe elements each having circumferential grooves at opposite ends, each of said grooves having a floor, said coupling comprising:
    a plurality of segments, each having oppositely disposed ends, and a respective connection member positioned at each said end, a first end of each said segment being connected to a second end of another of said segments such that said segments surround a central space for receiving said pipe elements;

a pair of arcuate projections positioned on opposite sides of and extending between said oppositely disposed ends of each of said segments;

an arcuate surface positioned on each of said projections, each said arcuate surface being engageable with said floor of said groove in one of said pipe elements, a cut-out being located at each end of each said arcuate surface;

a channel positioned between said projections on each of said segments;

a seal received within said channel and having an outer surface sized to support said segments in spaced apart relation to provide clearance about a circumference of said pipe elements including where measured adjacent to said connection members, said clearance being sufficient to permit insertion of said pipe elements into said central space, said seal having an inner surface sized to receive said pipe elements; wherein at least one of said connection members being adjustably tightenable for drawing each said arcuate surface into engagement with one of said floors.

11. The combination according to claim 10, wherein each said projection subtends an angle less than 180°.

12. The combination according to claim 10, wherein each one of said segments is deformable so as to substantially conform a curvature of each one of said arcuate surfaces to a curvature of one of said floors upon tightening of said at least one connection member.

13. The combination according to claim 10, wherein two of said connection members are adjustably tightenable.

14. The combination according to claim 10, wherein said coupling comprises at most two of said segments.

15. The combination according to claim 10, wherein said coupling comprises three of said segments.

16. The combination according to claim 10, wherein said seal has sufficient stiffness to maintain said segments in said preassembled state during shipping and through handling of said coupling during insertion of said pipe elements into said central space.

\* \* \* \* \*